Patented Sept. 1, 1942

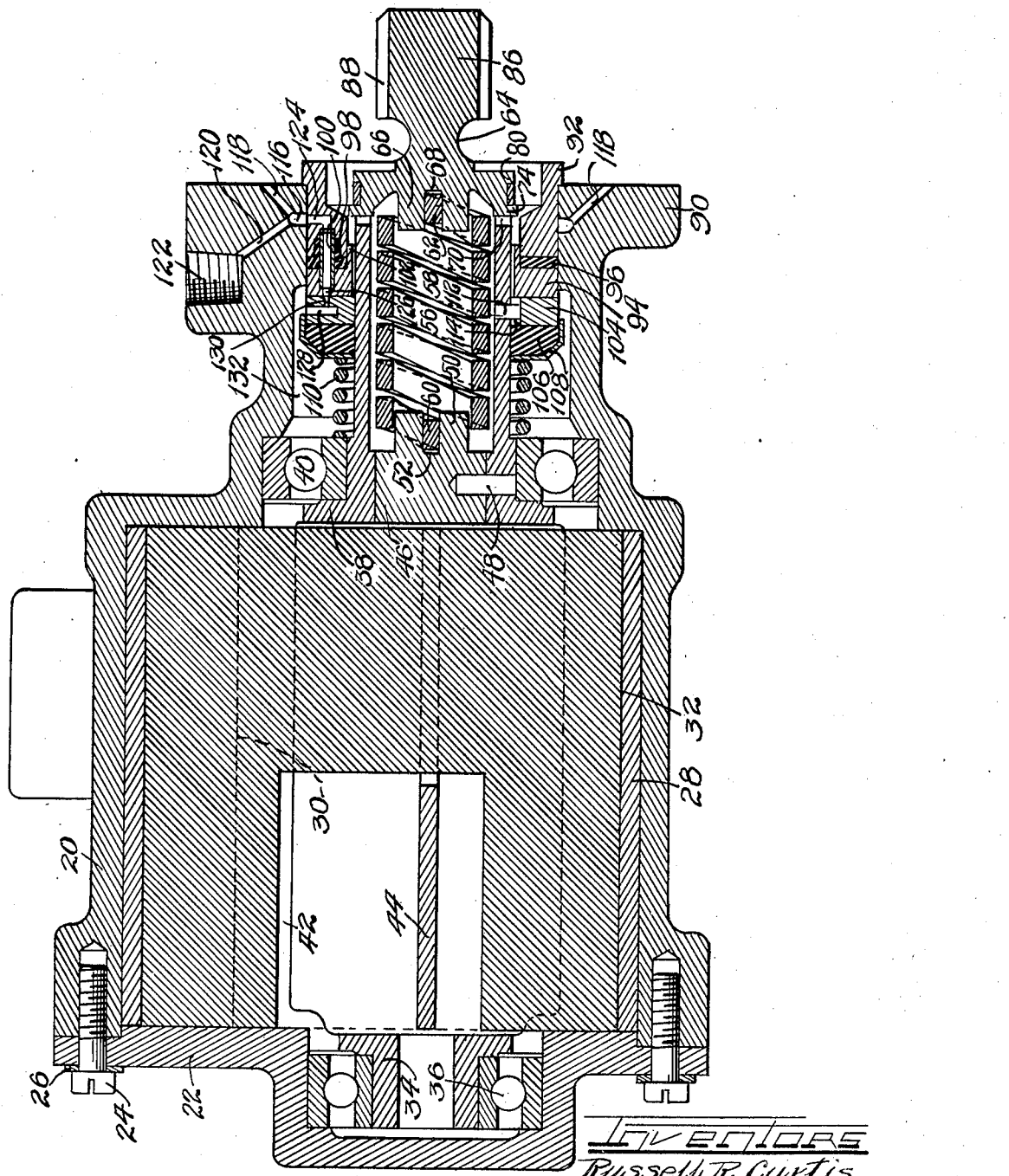

2,294,387

UNITED STATES PATENT OFFICE 2,294,387

AIRCRAFT AIR PUMP

Russell R. Curtis, Dayton, and Theodore R. Thoren, Bedford, Ohio, assignors to Curtis Pump Company, Dayton, Ohio, a corporation of Ohio Original application February 29, 1940, Serial No. 321,494. Divided and this application May 8, 1940, Serial No. 333,980

8 Claims. (Cl. 308—36.2)

This invention is a division of our copending application, Serial No. 321,494, filed February 29, 1940, and relates to air pumps and has special reference to air pumps for aircraft. Most modern aircraft employ a pump, usually of the rotary sliding vane type to provide air under pressure for operating de-icing equipment, and air under vacuum for operating flight instruments, etc.

Since any power pump having rotatable elements necessarily has a rotatable shaft extending, to which the driving force is applied, there should preferably be provided a seal to prevent leakage from the pump along the outside of the shaft, and since conservation of space is important, it is an object of the invention to conserve space by making the shaft hollow, then placing the drive within the shaft and the seal without the shaft, within the same axial dimensions.

A rotary pump of the sliding vane type when employed under the extreme load conditions imposed in aricraft service requires lubrication which is not only continuous but substantially perfect, for while sufficient lubricant should pass continuously thru the pump an excess amount of lubricant is undesirable.

It is therefore another object of the invention to provide a metering system for admitting lubricant to the pump under pressure and in a carefully measured amount during the entire time that the pump is under rotation, the metering system being so combined with the seal as to require no extra space in the structure.

Another object is to provide a pump structure having means whereby it is quickly and easily disassembled into its several parts so that renewal parts may be quickly substituted and repairs readily made.

These and other objects and advantages will become more clearly apparent from the following detailed description, reference being made to the drawing, wherein the figure of the drawing is an axial section thru a rotary pump embodying the principles of the invention.

The pump selected as an illustrative embodiment of the invention comprises a housing 20 having a head 22 secured thereto by screws 24 and lock washers 26. The head 22 supports one of the rotor bearings and provides a pressure tight closure for the end of the casing.

A liner 28 is press fitted in the casing and has port openings extending thru it which communicate with suction and discharge ports in the casing, but since the design of the ports has no bearing on this invention they are omitted from the drawing.

The rotor body 30 has its axis offset with respect to the liner 28 so that the rotor body touches the liner on one side, as at 32, as is usual in pumps of this type. A hollow stub shaft 34, an integral part of the rotor body 30, carries the bearing 36 which is supported in the head 22. A longer hollow drive shaft 38, also an integral part of the rotor body, carries the bearing 40 supported in the housing 20.

The rotor body 30 has four circumferentially equally spaced slots 42 into which two thru vanes 44 are slidably fitted. The two vanes are alike, one being turned end for end with respect to the other and positioned ninety degrees rotation therefrom. The type of vane and their number is selected for illustrative purposes only and is not intended as a structural limitation of the invention.

Press fitted into the hollow of the rotor driving shaft 38 is the driving plug 46 further secured against rotation in the shaft by the pin 48. An integral driving hub 50 on the plug is of reduced diameter and provided with a transverse driving slot 52.

A driving spring 54 comprises, in a single piece, an endless loop formed into the shape of a double coiled helical spring wherein one coil 56 lies between the other coil 58, the coils being joined together at both ends to compose driving portions 60 and 62 passing from the outside of one coil to the outside of the other thru their common axis.

A driving shank 64, has a hub 66 with a transverse slot 68 therein, substantially like the slotted hub 50 of the driving plug 46. The driving portions 60 and 62 of the spring lie in the slots 52 and 68 and should be fitted to the slots closely.

The outer end of the hollow rotor shaft 38 is provided with circumferentially spaced axial notches 70 to form overload driving jaws therebetween. The driving shank 64 has overload driving lugs 74 which are normally located circumferentially midway in the notches 70. When the pump is being driven thru the spring 54, the spring yields slightly and the lugs 74 move slightly closer to one or the other of the edges of the driving jaws on the end of the shaft 38. It is, however, only under extreme overload conditions that the torsional deflection of the spring is sufficient to allow the lugs 74 to engage the driving jaws in driving relation.

Arcuate grooves extend circumferentially around the driving jaws and the interengaged lugs 74 respectively, and a snap ring 80 is sprung into these grooves to hold the shank and shaft in assembled relation and against greater axial movement than is desired. The ring 80 is preferably fitted quite loosely in the grooves to allow slight misalignment of the respective axes of the shaft and shank.

One end of the ring 80 is bent over to extend into an appropriate notch in the shaft 38 (not shown), thereby compelling unitary rotation of the ring and shaft and maintaining the shaft in the ring intermediate the notches 70.

The outer end 86 of the shank 64 is provided with external splines 88 adapted to fit slidably into a corresponding internally splined opening in the end of the engine shaft. The flange 90 of the body 20 may be bolted or similarly secured to a mounting pad on the engine.

The means provided for sealing against leakage from the drive end of the pump comprises several non-rotative and several rotative members. The metal seal cap 92 is press fitted to the body 20, a metal ring 94 fits the body 20 freely, and a synthetic rubber washer 96 is interposed between the two parts to seal against leakage which might occur around the outside of ring 94, between parts 94 and 92 and then thru the inside of cap 92.

The cap 92 is counterbored to receive the small hub 98 which is molded as an integral part of the rubber washer 96. The ring 94 is counterbored for the small tube 100 which is press fitted in the ring and extends first tightly thru the hub 98 then slidably into a hole in the cap 92.

The ring 94 is therefore held non rotative by the tube 100, and since the ring fits into the body 20 more closely than it does around the shaft 38, there is no possibility of the ring swinging with the tube 100 as an axis and dragging on the rotating shaft 38.

Since synthetic rubber is subject to swelling under the action of oil and subject to flow under heavy pressure, a piloting end 102 extends from the ring 94 thru and beyond the inner diameter of the rubber washer 96 to confine it to its allotted space.

The rotatable members of the sealing means comprise a metal ring 104, a synthetic rubber ring 106, a cup 108 and a spring 110. The metal ring 104 is compelled to rotate with the shaft 38 by a pin 112, one end of which is press fitted into a hole in the shaft and the other end slidable in a keyway 114 in the ring. The rubber ring 106 fits over the shaft 38 closely and is confined to normal dimensions by the cup 108, the open side of which extends over the ring 104 but should not fit it too closely. The spring 110 abuts the inner member of the bearing 40, its expansive force acting against the cup 108 whereby a seal is made between the rubber ring 106 and shaft 38 and between the rubber ring and the metal ring 104, all of these parts rotating at the same speed.

The rotatable metal ring 104, being movable axially, is therefore resiliently held in contact with the nonrotatable metal ring 94 and it is important that their contacting faces each be finished to a mirror like surface to maintain a perfect seal under relative rotation.

Seals of this class, as customarily constructed, would have the non-rotative ring 94 press fitted directly into the casing 20 and would, of course, thereby eliminate the ring 96 by combining the ring 94 and cap 92 as one part.

Where, however, the non-rotative ring is press fitted into the casing, there is substantially always slight distortion of the press fitted ring, which, altho practically unmeasurable, nevertheless manifests itself by slight leakage at the joint. The usual procedure is then to lap the rings 104 and 94 together in place by rotation of the ring 104 against the ring 94 with an abrasive lapping compound therebetween. This procedure produces circular scratches which altho minute can never be wholly eliminated by circular lapping.

Inasmuch as, the efficacy of the seal is in proportion to the perfection of the contacting surfaces of rotatable ring 104 with non-rotatable ring 94, these surfaces, in the embodiment herein shown, are ground, lapped and honed to perfect mirror like planes separately and before assembly, and are not thereafter lapped one on the other by rotative movement therebetween, but are instead lapped according to the well known process of producing perfect plane surfaces which comprises movement of the part being lapped in constantly varying direction with respect to the plane surface lap.

Since, in the assembly, the rings 104 and 94 are resiliently held, neither being fitted closely to any other part so as to be distorted, it follows that the seal thus produced is substantially perfect under rotation.

In order to cause several of the seal members above described, to function also as a metering means for the pump lubricant, the end of the casing 20 is provided internally with an annular groove 116 to which oil under pressure is brought thru one of the small holes 118 or 120. The hole 120 communicates with a tapped opening 122 adapted for connection with the main oil pressure system of the engine by suitable piping, while the hole 118 is positioned to meet a corresponding hole in the mounting pad of the engine, the hole in the pad communicating with a chamber in the engine which contains oil under pressure. A series of additional holes 118 are preferably provided so that the pump may be mounted inverted, or, turned ninety degress either direction on its axis and in either case have a hole 118 meet the hole in the engine mounting pad. The press fit of the cap 92 into the body 20 closes the inside of the groove 116 and converts it into a pressure tight annular channel.

A small passageway 124 in cap 92 connects the annular channel 116 to the end of the tube 100, the passageway from the other end of the tube being prolonged by a hole 126 which extends from the end of the tube to the joint between the non-rotative ring 94 and the rotatable ring 104.

A radial opening 128 in the rotatable ring 104 is connected by a tiny metering hole 130 to the contacting surfaces between rings 104 and 94.

It will now be evident that there is only one joint in the sealing means where there is relative rotation, and that there is a continuous supply of oil under pressure conveyed to this joint from channel 116 thru tube 100 and hole 126, and that while the end of the hole 126 is kept closed by the rotating surface of ring 104 for the greater portion of each revolution, a passage way for oil is nevertheless completed during about 2⅓% of each revolution thru the metering hole 130 and radial hole 128 to the space 132 from which it finds its way thru the bearing 40 to the blades 44 and rear bearing 36.

The hole 126 is made enough larger than the tiny metering hole 130, that should slight variance in the relative radial positioning of the two holes result from inaccuracies in manufacture, the percentage of time the oil passage is completed, and consequently the amount of oil metered will not be seriously affected.

The advantage of the resilient whip absorbing universal drive will be obvious. When the device is inactive, the lugs 74 of the drive shank 64 will be midway in the notches 70 and when under normal load only slightly off the midway position one way or the other depending on the direction of rotation. Under extreme overload condition, however, such as might injure the driving spring 54 if much further increased, the lugs 74 of the drive shank will make contact with the jaws on the end of the rotor shaft 38 and there will thenceforth be a positive drive as long as such overload conditions prevail.

When the device is once assembled as shown in the drawing, the entire rotor, drive and seal, with the exception of the cap 92 may be withdrawn from the casing 20 by merely removing the head 22, whereby worn or damaged parts may be readily replaced or repaired.

Having described an embodiment of our invention in which the objects hereinbefore set forth are achieved,

We claim:

1. In a pump or the like, having a casing and a rotatable shaft extending from said casing, a combined seal and lubricant metering device comprising, an end closure for said casing having an opening to pass said shaft freely, a resilient packing washer covering the inner face of said closure, a metal seal ring covering the inner face of said packing washer, a tube located intermediate the inner and outer diameters of said seal ring extending in an axial direction from within said ring, tightly thru the packing washer and slidably into an axially extending opening in the end closure, a passageway to convey lubricant under pressure connecting said axial opening to a source of supply, a conduit opening extending from the inner face of said seal ring and terminating in the opening in said tube, a second seal ring having its outer face resting against the inner face of the first seal ring and having a small metering opening in the outer face communicating with the inside of the casing, said metering opening being so located as to register with said conduit opening in said first seal ring at each revolution of the shaft, means to drivably connect said second seal for rotation with said shaft but allow it to move axially thereon, a packing ring against the inner face of the second of said seal rings, a metal part against said packing ring, and resilient means pressing said metal part against said packing ring.

2. The structure defined in claim 1 wherein the metering opening in the outer face of the second said seal ring comprises a radial hole extending from the outer periphery of the ring inward and a tiny lateral opening extending from the outer face of the ring into the radial opening, said lateral opening being located at substantially the same distance from the pump axis as the conduit in the first seal ring extending from the inner face thereof to the tube opening in the first said seal washer.

3. The structure defined in claim 1 wherein the said seal washer has an integral hub on its outer face, tightly surrounding said tube and extending into a corresponding counterbore in the end closure, the tube extending beyond the end of said hub into the end closure.

4. The structure defined in claim 3 wherein the casing is internally grooved, the end closure is press fitted into place over said groove, and the means containing a passageway to convey lubricant under pressure to the opening in said end closure comprises holes in the casing communicating with said groove, and a radial hole in the end closure connecting the groove to said axial opening in the end closure.

5. A combined seal and lubricant metering device for pumps and the like having a casing and a rotatable shaft extending therefrom comprising, an end closure extending into and retained within said casing against rotation, a ring spaced axially from said end closure, a resilient packing washer between said end closure and said ring, registered openings extending axially through said ring, packing washer and said end closures to a source of lubricant supply, means in said openings connecting said ring, packing washer and end closure for maintaining said openings in registry, a second ring rotatable with said shaft in face engagement with said first mentioned ring, an opening in said second ring extending from the face in engagement with said first-mentioned ring to the inside of said casing, said opening in said second ring registering with the axial opening in said first ring at each revolution of said shaft, and a resilient expansive seal between said shaft and said second ring.

6. A metering device for pumps and the like having a casing and a rotatable shaft extending therefrom comprising a tubular end closure partially extending into and retained within said casing against rotation, a first seal ring construction abutting the inner face of said end closure, registered axial openings through said seal ring construction and a portion of said end closure for connection to a lubricant source of supply, tubular means in said openings connecting said seal ring construction and said end closure, a second seal ring construction abutting the inner face of said first seal ring construction and engaging said shaft for rotation therewith, and an opening in said second seal ring construction connecting the outer face thereof and the interior of said casing, said opening in the second seal ring construction registering with said opening in the first seal ring construction at each revolution of said shaft.

7. A seal adapted to meter lubricant to relatively movable surfaces which comprises a hollow casing having an internal abutment shoulder, a member mounted in said casing for relative rotative movement therewith, a first seal construction engaging the shoulder and loosely embracing said member, said first seal construction including a resilient seal engaging the inner periphery of the casing, said abutment shoulder having a hole therein communicating with the outside of the casing, said first seal construction having a hole therethrough, a hollow pin projecting into both holes for holding the first seal construction against rotation relative to the shoulder and for providing a lubricant passageway, a second seal construction carried by said member in sliding sealing relation to the first seal construction, said second seal construction having a metering hole therein communicating with the interior of the casing and adapted to intermittently register with the lubricant passageway to meter lubricant from the exterior to the interior of the casing.

8. A metering and sealing device adapted to meter lubricant to a bearing which comprises a housing having an internal abutment shoulder, a bearing in said housing, a shaft mounted in said bearing for rotation relative to the housing, a stationary seal construction surrounding said shaft and engaging the internal abutment shoulder of the housing, a rotatable seal construction mounted on said shaft in said housing and rotatable with the shaft adjacent the stationary seal construction in sliding seal engagement therewith, said abutment shoulder having a hole therein communicating with the outside of the housing, said stationary seal construction having a hole therethrough, a hollow pin projecting into both holes for holding the stationary seal construction against rotation relative to the shoulder and for providing a lubricant passageway, said rotatable seal construction having a metering hole therein communicating with the interior of the housing and adapted to intermittently register with the lubricant passageway to meter lubricant from the exterior of the housing to the bearing in the housing.

RUSSELL R. CURTIS.
THEODORE R. THOREN.